(12) United States Patent
James et al.

(10) Patent No.: US 8,808,485 B2
(45) Date of Patent: Aug. 19, 2014

(54) ENVIRONMENTALLY FRIENDLY POLYURETHANE COMPOSITE PANEL

(75) Inventors: Allan James, Oxford, MI (US); Daniele Paolini, Coreggio (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/805,380

(22) PCT Filed: Jul. 11, 2011

(86) PCT No.: PCT/US2011/043503
§ 371 (c)(1),
(2), (4) Date: Dec. 19, 2012

(87) PCT Pub. No.: WO2012/015583
PCT Pub. Date: Feb. 2, 2012

(65) Prior Publication Data
US 2013/0136931 A1 May 30, 2013

(30) Foreign Application Priority Data

Jul. 27, 2010 (IT) .............................. MI2010A1380

(51) Int. Cl.
*B29C 65/70* (2006.01)
*B27D 1/08* (2006.01)

(52) U.S. Cl.
USPC .................. 156/222; 156/71; 156/72; 156/94

(58) Field of Classification Search
USPC ..................... 428/423.1; 156/71, 72, 94, 222
See application file for complete search history.

(56) References Cited

U.S. PATENT DOCUMENTS

| 6,761,953 B2 * | 7/2004 | Haas et al. ...................... 428/73 |
| 2010/0178502 A1 * | 7/2010 | Spilman et al. ........... 428/355 R |

* cited by examiner

*Primary Examiner* — Thao T. Tran

(57) ABSTRACT

The present invention is a method to make an environmentally friendly polyurethane molded article (100) comprising at least 20 percent renewable materials and molded articles made therefrom. Specifically, the method provides for molding a polyurethane coated sandwich structure (40) comprising a honey comb core (30) having fiber reinforcing layers (10, 20) to provide an environmentally friendly polyurethane molded article with a desired shape such as an automobile load floor. The polyurethane coating is derived from a polyurethane—forming mixture comprising an isocyanate component and a polyol component. Specifically, the polyol component comprises one or more natural oil based polyol, preferably comprising at least one of a hydroxymethylated fatty acid or a hydroxymethylated fatty acid (methyl) ester.

11 Claims, 3 Drawing Sheets

ENVIRONMENTALLY FRIENDLY POLYURETHANE COMPOSITE PANEL

CROSS REFERENCE STATEMENT

This application claims the benefit of priority of IT Application No. MI2010A001380, filed Jul. 27, 2010, which is incorporated herein by reference.

FIELD OF THE INVENTION

The present invention relates to environmentally friendly composite polyurethane (PU) molded articles, in particular environmentally friendly PU sandwich structural parts, a process for their production and their uses.

BACKGROUND OF THE INVENTION

Processes for the production of sandwich elements for the fabrication of flat sheets have been known for some time. The sandwich construction is made up of a light and compression-resistant core with high-strength covering layers. This composite structure is formed by a PU reaction mixture which, when applied on both sides in a thermal compression molding process, can form an indissoluble bond. The inner core layer of the sandwich structure is preferably made up of cardboard with a honeycomb structure, which during the compression procedure acts as a spacer for the covering layers wetted with PU. The wetting of the sandwich covering layers is preferably affected by spraying. During the PU application by means of a mixing head the substrate carrier is arranged in the horizontal or preferably in the vertical position, since in this orientation a double-sided application can be carried out at the same time. The substrate carrier and/or the polyurethane mixing head may be robot-guided.

Three-dimensional molded articles can also be produced due to the combination of compression and shaping processes. The honeycomb core, which for sheet materials is built up over the whole surface to a uniform thickness a few tenths of a millimeter thick, is now compressed in partial regions to a small percentage of its original size. The shaping of the outer contour of the finished part is effected by a nipping-off of the sandwich structure by pinch edging in the shaping tool (mold), so that the structural part has closed outer edges after removal from the mold. In this shaping process, a three-dimensional structural part is obtained that has unlaminated visible surfaces and also unlaminated visible edges.

SUMMARY OF THE INVENTION

The object of the present invention is to provide a method for the production of an environmentally friendly polyurethane molded article, comprising the steps of:

a) applying a first fiber material having a first surface and a second surface to a first surface of a core material;

b) applying a second fiber material having a first surface and a second surface to a second surface of the core forming a sandwich structure having a first and a second surface wherein the first and second fiber material may be the same of different;

c) applying a polyurethane-forming mixture comprising an isocyanate component and a polyol component comprising one or more natural oil based polyol to the first and a second surface of the sandwich structure forming a polyurethane-forming mixture coated sandwich structure;

d) placing the polyurethane-forming mixture coated sandwich structure into a mold;

e) shaping the polyurethane-forming mixture coated sandwich structure in a mold at a temperature between 100° C. and 160° C. while curing the polyurethane-forming mixture to form a molded polyurethane molded article;

f) removing the molded article from the mold; and e) optionally, post-treating the molded article.

In an embodiment of the present invention, the one or more natural oil based polyol of the method disclosed herein above comprises at least one of a hydroxymethylated fatty acid or a hydroxymethylated fatty acid (methyl)ester.

In another embodiment of the present invention, the one or more natural oil based polyol of the method disclosed herein above comprises at least one of a polymerized hydroxymethylated fatty acid or a hydroxymethylated fatty acid (methyl)ester.

In another embodiment of the present invention, the one or more natural oil based polyol of the method disclosed herein above comprises the reaction product of at least one of a hydroxymethylated fatty acid or a hydroxymethylated fatty acid (methyl)ester and an initiator compound having a OH functionality, primary amine functionality, secondary amine functionality, or combination OH, primary, or secondary amine functionality, of between about 2 and about 4.

In another embodiment of the present invention, the initiator compound of the method disclosed herein above is selected from ethylene glycol, 1,2- and 1,3-propylene glycol, 1,4- and 2,3-butane diol, 1,6-hexane diol, 1,8-octane diol, neopentyl glycol, cyclohexane dimethanol, 1,3-cyclohexane dimethanol and 1,4-cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol, and combinations thereof.

In another embodiment of the present invention, the initiator compound of the method disclosed herein above comprises a mixture of 1,3-cyclohexane dimethanol and 1,4-cyclohexane dimethanol.

In another embodiment of the present invention the core material of the method disclosed herein above is a honeycomb paperboard, a plastic honeycomb, aluminum honeycomb, balsa wood, a rigid foam, compressed or uncompressed cotton fibers, compressed or uncompress natural fibers, or compressed or uncompressed plastic fibers.

In another embodiment of the present invention the first fiber material and second fiber material of the method disclosed herein above are independently a reinforcing fiber material, a woven fiber mat, a non-woven fiber mat, a continuous strand fiber, a fiber random structure, a fiber tissue, chopped fibers, ground fibers, a knitted fabric, or combination thereof, preferably the first fiber material and second fiber material independently comprise carbon fibers, polymeric fibers, aramide fibers, mineral fibers, glass fibers, natural fibers, or mixtures thereof.

Another embodiment of the present invention is an environmentally friendly polyurethane molded article made by the method disclosed herein above, preferably the environmentally friendly polyurethane molded article comprises at least 20 percent renewable materials, preferably the environmentally friendly polyurethane molded article is an automobile load floor.

BRIEF DESCRIPTION OF THE DRAWINGS

FIG. 1a is a magnified view the sandwich structure of the method shown in FIG. 1;

FIG. 1b is a magnified view of the molded article of the method shown in FIG. 1;

DETAILED DESCRIPTION OF THE INVENTION

Figure 1:
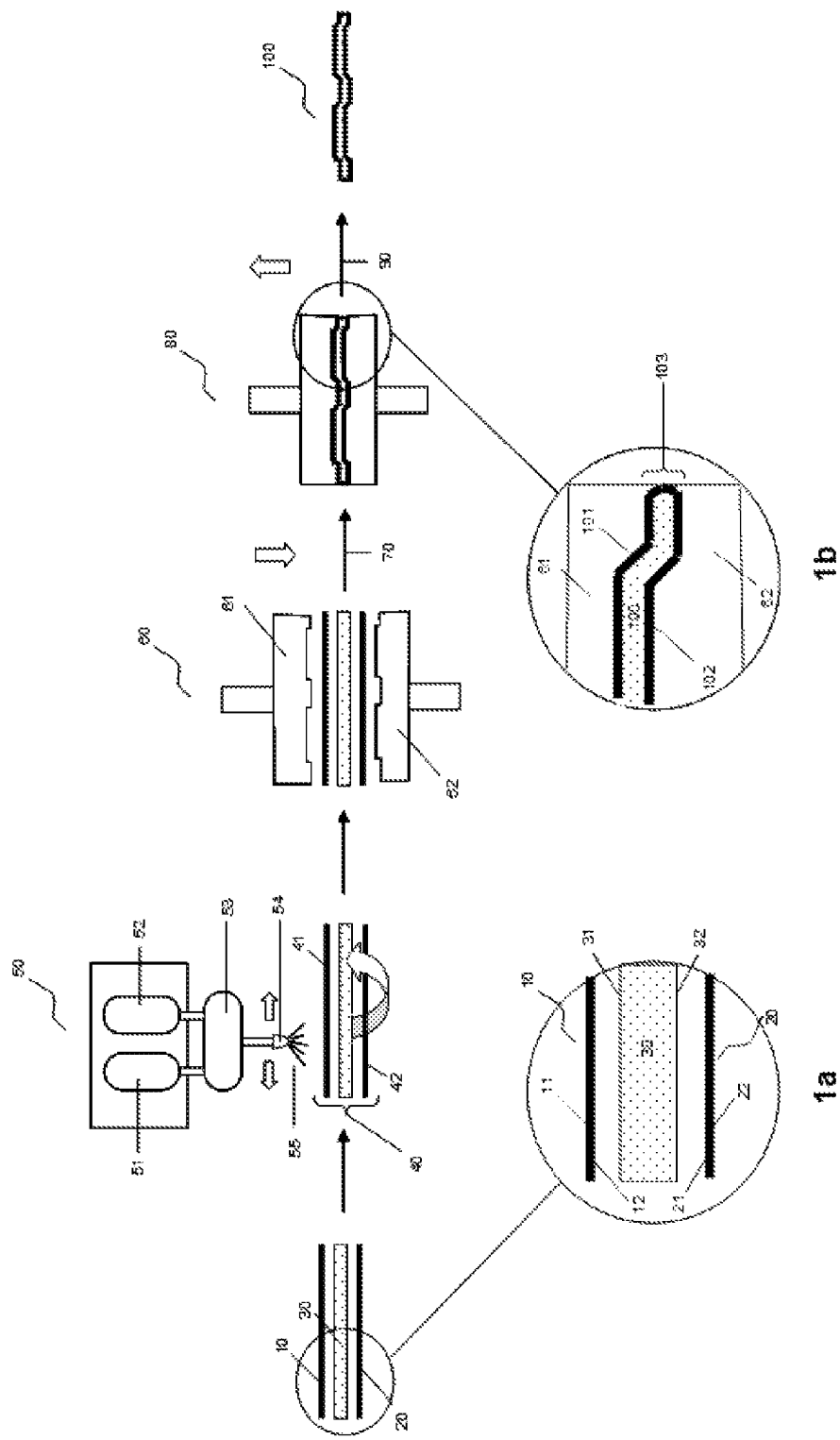
FIG. 1 is an illustration of a method of the present invention.

In one embodiment, the present invention is an environmentally friendly molded polyurethane article comprising a polyurethane coated sandwich structure comprising a core material between layers of fiber material, wherein said molded article is light weight and demonstrates good load bearing performance.

Suitable materials for the core are well known, for example a honeycomb paperboard, a plastic honeycomb, aluminum honeycomb, balsa wood, a rigid foam, compressed or uncompressed cotton fibers, compressed or uncompress natural fibers, compressed or uncompressed plastic fibers such as polyethylene terephthalate (PET), or the like.

Suitable fiber materials, preferably a reinforcing fiber material, for covering the core and forming a sandwich structure include woven fiber mats, non-woven fiber mats, continuous strand fiber, fiber random structures, fiber tissues, chopped fibers, ground fibers, knitted fabrics, or any combination thereof. Preferred fibers are carbon fibers, polymeric fibers, for example KEVLAR™ fibers or aramide fibers, mineral fibers, glass fibers, natural fibers such as Kenaf, Hemp, coconut or the like, or mixtures thereof. Glass fibers are the most preferred fiber.

The polyurethane coating of the polyurethane molded article of the present invention is formed from a polyurethane-forming mixture. The polyurethane-forming mixture used in the method of the present invention will generally include:

A) a polyol component comprising at least one natural oil based polyol, which includes at least one short-chain and one long-chain polyol, the individual polyols having a functionality of 1.5 to 6;

B) at least one polyisocyanate;

C) optionally, a blowing agent;

D) an activator;

as well as

E) optional auxiliary substances, mold release agents and additives.

The polyurethane-forming mixture of the present invention comprises A) a polyol component. The polyol component comprises one or more natural oil based polyol (NOBP). The polyol component may comprise one or more non-natural oil based polyol. Suitable polyols which may be included in the polyol component are polyols with at least two H atoms reactive to isocyanate groups. Polyester polyols and polyether polyols are preferably used.

Natural oil based polyols are polyols based on or derived from renewable feedstock resources such as natural plant vegetable seed oils. The renewable feedstock resources may also include and/or genetically modified (GMO) plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. Preferably the natural product contains at least about 85 percent by weight unsaturated fatty acids. Examples of preferred vegetable oils include, for example, those from castor, soybean, olive, peanut, rapeseed, corn, sesame, cotton, canola, safflower, linseed, palm, grape seed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Examples of animal products include lard, beef tallow, fish oils and mixtures thereof. Additionally, oils obtained from organisms such as algae may also be used. A combination of vegetable, algae, and animal based oils/fats may also be used.

For use in the production of polyurethane products, the natural material may be modified to give the material isocyanate reactive groups or to increase the number of isocyanate reactive groups on the material. Preferably such reactive groups are a hydroxyl group.

The modified natural oil derived polyols may be obtained by a multi-step process wherein the animal or vegetable oils/fats are subjected to transesterification and the constituent fatty acids recovered. This step is followed by hydroformylating carbon-carbon double bonds in the constituent fatty acids followed by reduction to form hydroxymethyl groups. Suitable hydroformylation/reduction methods are described in U.S. Pat. Nos. 4,731,486; 4,633,021; and 7,615,658, which are incorporated by reference herein in their entirety. The hydroxymethylated fatty acids or esters thereof are herein labeled "monomers" which form one of the building blocks for the natural oil based polyol. The monomers may be a single kind of hydroxymethylated fatty acid and/or hydroxymethylated fatty acid (methyl)ester, such as hydroxymethylated oleic acid or methylester thereof, hydroxymethylated linoleic acid or methylester thereof, hydroxymethylated linolenic acid or methylester thereof, α- and γ-linolenic acid or methyl ester thereof, myristoleic acid or methyl ester thereof, palmitoleic acid or methyl ester thereof, oleic acid or methyl ester thereof, vaccenic acid or methyl ester thereof, petroselinic acid or methyl ester thereof, gadoleic acid or methyl ester thereof, erucic acid or methyl ester thereof, nervonic acid or methyl ester thereof, stearidonic acid or methyl ester thereof, arachidonic acid or methyl ester thereof, timnodonic acid or methyl ester thereof, clupanodonic acid or methyl ester thereof, cervonic acid or methyl ester thereof, or hydroxymethylated ricinoleic acid or methylester thereof. In one embodiment, the monomer is hydroformulated methyloelate. Alternatively, the monomer may be the product of hydroformylating hydroformulating the mixture of fatty acids recovered from transesterifaction process of the animal or vegetable oils/fats to form hydroxymethylated fatty acids or (methyl)esters thereof. In one embodiment the monomer is hydroxymethylated hydroformulated soy bean fatty acids or methyl esters thereof which may have an average OH functionality of between about 0.9 and about 1.1 per fatty acid, preferably, the functionality is about 1. In another embodiment the monomer is hydoformulated castor bean fatty acids. In another embodiment, the monomer may be a mixture of selected hydroxymethylated fatty acids or (methyl)esters thereof.

A polyol is then formed by reacting the hydroxymethylated monomer with an appropriate initiator compound to form a polyester or polyether/polyester polyol. Such a multi-step process is commonly known in the art, and is described, for example, in PCT publications WO 2004/096882 and 2004/096883. The multi-step process results in the production of a polyol with both hydrophobic and hydrophilic moieties, which results in enhanced miscibility with both water and conventional petroleum-based polyols. In one embodiment the polyol comprises the reaction product of at least one of a hydroxymethylated fatty acid and a hydroxymethylated fatty acid (methyl)ester and an initiator compound having a OH functionality, primary amine functionality, secondary amine functionality, or combination OH, primary, or secondary amine functionality, of between about 2 and about 4.

The initiator for use in the multi-step process for the production of the natural oil derived polyols may be any initiator used in the production of conventional petroleum-based polyols. Preferably the initiator is selected from the group consisting of glycerine; neopentylglycol; 1,2-propylene glycol; 1,3-propylene glycol; trimethylolpropane; pentaerythritol; quinitol; mannitol; sorbitol; sucrose; methyl glycoside; glycerol; aminoalcohols such as ethanolamine, diethanolamine, and triethanolamine; alkanediols such as 1,6-hexanediol, 1,4-butanediol; 2,3-butanediol; 2-methyl-1,3-propane diol; 1,4-cyclohexane diol; 1,3-cyclohexanedimethanol, 1,4-cyclohexanedimethanol, 2,5-hexanediol; ethylene glycol; diethylene glycol, triethylene glycol; tetraethylene glycol; dipropylene glycol; dibutylene glycol; 1,8-octane diol; bis-3-aminopropyl methylamine; ethylene diamine; diethylene triamine; 9(1)-hydroxymethyloctadecanol, 1,4-bishydroxymethyl-cyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bis-hydroxymethyloctadecanol; 1,2,6-hexanetriol; 1,2,4-butane triol, trimethylolethane; and combination thereof. Preferably the initiator is selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof. Preferably, the initiator is glycerol, trimethylopropane, pentaerythritol, sucrose, sorbitol, and/or mixture thereof.

Other initiators include other linear and cyclic compounds containing an amine Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1,2-ethanediamine, N-Methyl-1,3-propanediamine, N,N-dimethyl-1,3-diaminopropane, N,N-dimethylethanolamine, 3,3'-diamino-N-methyl-dipropylamine, N,N-dimethyldipropylenetriamine, aminopropyl-imidazole.

In one embodiment, the initiators are alkoxlyated with ethylene oxide, propylene oxide, or a mixture of ethylene and at least one other alkylene oxide to give an alkoxylated initiator with a molecular weight between about 200 and about 6000, preferably between about 500 and about 5000. In one embodiment the initiator has a molecular weight of about 550, in another embodiment the molecular weight is about 625, and in yet another embodiment the initiator has a molecular weight of about 4600.

In one embodiment, at least one initiator is a polyether initiator having an equivalent weight of at least about 400 or an average at least about 9.5 ether groups per active hydrogen group, such initiators are described in USP Application PCT/US09/37751, filed on Mar. 20, 2009, entitled "Polyether Natural Oil Polyols and Polymers Thereof" the entire contents of which are incorporated herein by reference.

The ether groups of the polyether initiator may be in poly (alkylene oxide) chains, such as in poly(propylene oxide) or poly(ethylene oxide) or a combination thereof. In one embodiment, the ether groups may be in a diblock structure of poly(propylene oxide) capped with poly(ethylene oxide).

In one embodiment, a NOBP is made with an initiator or combination of initiators having an average equivalent weight of between about 400 and about 3000 per active hydrogen group. All individual values and subranges between about 400 and about 3000 per active hydrogen group are included herein and disclosed herein; for example, the average equivalent weight can be from a lower limit of about 400, 450, 480, 500, 550, 600, 650, 700, 800, 900, 1000, 1200, or 1300 to an upper limit of about 1500, 1750, 2000, 2250, 2500, 2750, or 3000 per active hydrogen group.

Thus, in this embodiment, at least two of the natural oil based monomers are separated by a molecular structure having an average molecular weight of between about 1250 Daltons and about 6000 Daltons. All individual values and subranges between about 1250 Daltons and about 6000 Daltons are included herein and disclosed herein; for example, the average molecular weight can be from a lower limit of about 1250, 1500, 1750, 2000, 2250, 2500, 2750, 3000, or Daltons to an upper limit of about 3000, 3500, 4000, 4500, 5000, 5500, or 6000 Daltons.

To form the polyether initiator, the active hydrogen groups may be reacted with at least one alkylene oxide, such ethylene oxide or propylene oxide or a combination thereof; or a block of propylene oxide followed by a block of ethylene oxide, to form a polyether polyol by means within the skill in the art. The polyether initiator may be used as an initiator for reaction with at least one natural oil based monomer. Alternatively the initiator is reacted by means within the skill in the art to convert one or more hydroxyl groups to alternative active hydrogen groups, such as is propylene oxide.

The functionality of the resulting natural oil based polyols is above about 1.5 and generally not higher than about 6. In one embodiment, the functionality is below about 4. The hydroxyl number of the of the natural oil based polyols may be below about 300 mg KOH/g, preferably between about 50 and about 300, preferably between about 60 and about 200. In one embodiment, the hydroxyl number is below about 100.

The polyol component further comprises one or more short-chain polyol and/or one or more long-chain polyol. Such short-chain polyols are well known, for example VORANOL™ CP260, VORANOL CP 270, VORANOL 280, and VORANOL 446. Long-chain polyols are also well known, for example VORANOL CP 4702, VORANOL CP 6001, and VORANOL CP4155.

The polyol component of the present invention comprises at least 10 percent natural oil based polyol, preferably at least 15 percent natural oil based polyol, more preferably at least 20 percent natural oil based polyol, more preferably at least 25 percent natural oil based polyol, more preferably at least 30 percent natural oil based polyol, more preferably at least 35 percent natural oil based polyol, more preferably at least 40 percent natural oil based polyol, more preferably at least 45 percent natural oil based polyol, more preferably at least 50 percent natural oil based polyol, more preferably at least 55 percent natural oil based polyol, more preferably at least 60 percent natural oil based polyol, more preferably at least 65 percent natural oil based polyol, more preferably at least 70 percent natural oil based polyol, and more preferably at least 75 percent natural oil based polyol.

The polyurethane-forming mixture of the present invention comprises B) an isocyanate component. Any suitable isocyanate for use in polyurethanes, polyureas, and mixtures thereof are acceptable. Preferably the isocyanate component comprises a higher-nuclear isocyanate, for example diphenylmethane diisocyanate series (MDI types), their prepolymers or crude (MDI), for example PAPI™ 20, PAPI 27, PAPI 94, PAPI 95, Isonate 143LM, Isonate 181, SPECFLEX™ BP80.

As blowing agents C) there may generally be used chemically or physically acting compounds. As chemically acting blowing agent there may preferably be used water, which forms carbon dioxide by reaction with the isocyanate groups. Examples of physical blowing agents are (cyclo)aliphatic hydrocarbons, preferably those with 4 to 8, more preferably 4 to 6 and most preferably 5 carbon atoms, partially halogenated hydrocarbons, or ethers, ketones or acetates. A blowing effect can also be achieved by adding compounds that decompose at temperatures below room temperature with the evolution of gases. The various blowing agents may be used individually or in mixtures with respect to one another.

Suitable catalysts are well known and include the conventional activators for the blowing and crosslinking reaction, such as, for example, amines and metal salts. For example, bis(2-dimethylaminoethyl) ether, such as NIAX™ A1, JEFFCAT™ ZR10, DABCO™ B11, dimethylethylamine (DMEA), or dimethyltin dilaurate.

Suitable D) activators are well known, for example triethylene diamine in propylene glycol, DABCO 33LV, POLYCAT™ 15, or DABCO DC 1.

For component E) other auxiliary substances, mold release agents and additives may optionally be incorporated in the reaction mixture. Examples of such additives include surface-active additives such as emulsifiers, flame retardants, nucleation agents, antioxidants, lubricants and mold release agents, colorants, dispersion aids and pigments.

The isocyanate and polyol components are generally reacted in amounts such that the ratio of equivalents of NCO groups of the polyisocyanate to the total equivalents of the hydrogen atoms of the remaining components reactive to isocyanate groups is from 0.8:1 to 2:1, preferably from 0.9:1 to 1.7:1 and more preferably 1.3:1 to 1.7:1.

In one embodiment, at least some portion of the polyurethane-forming mixture added to the reinforcing fiber covering layers or reinforcing fiber mat, must be charged with a gas, preferably air, nitrogen ($N_2$), or carbon dioxide ($CO_2$) and also contain a foam stabilizer. For certain molded articles, the addition of a gas may improve edge definition. In addition, it is possible to increase the amount of polyurethane proportionately to the application surface and prevent or at least minimize run-off or dripping. The incorporation of the gas may be carried out by any of the known methods, such as, e.g., batch or online methods, for example see US Publication 2005/0280173, which is incorporated herein in its entirety.

Suitable foam stabilizers include any of those known to those skilled in the art. Examples of particularly preferred foam stabilizers are polyether siloxanes, particularly those which are water-soluble. The preferred stabilizer compounds are generally synthesized in such a way that a copolymer of ethylene oxide and propylene oxide is bonded to a polydimethylsiloxane residue. Such foam stabilizers are described, for example, in U.S. Pat. Nos. 2,834,748; 2,917,480; and 3,629,308, which are incorporated by reference herein in their entirety. Of particular interest are polysiloxane-polyoxyalkylene copolymers multiply branched via allophanate groups such as those described in DE-OS 25 58 523. Also suitable as foam stabilizers are other organopolysiloxanes, oxyethylated alkylphenols, oxyethylated aliphatic alcohols, paraffin oils, castor oil esters and castor oil acid esters, Turkey Red oil and groundnut oil, and cell regulators such as paraffins, aliphatic alcohols and dimethylpolysiloxanes. For improved emulsifying effect, cell structure and/or stabilization, oligomeric polyacrylates with polyoxyalkylene residues and fluoroalkane residues as side groups may be used. The foam stabilizer is generally used in an amount of from 0.01 to 5 parts by weight, per 100 parts by weight of the polyol.

The sandwich structure of the present invention is normally produced in such a way that a reinforcing fiber covering layer is applied to both sides of the core material. A polyurethane-forming two-component mixture (so-called isocyanate and polyol component) is then added. At the same time that the polyurethane-forming mixture is added, chopped fibers may optionally be applied over the whole or part of one or both surface. For example, when a reinforcing fiber mat is used in steps a) and/or b), the mat is preferably first taken and impregnated in a conventional way with a polyurethane-forming mixture and then one or more types of chopped fibers may additionally be applied at the same time over the whole or part of the surface(s). Bonding of these additionally applied, chopped fibers wetted with PU takes place.

The PU molded articles produced in accordance with the present invention may, be laminated with covering layers or decorative substances during the molding step or in a subsequent step after removal from the mold according to known processes. If suitable covering layers or decorative substances are used, the bonding to the PU molded article may already take place during the production step by first of all taking the covering layer or decorative substance and at the same time compressing it with the sandwich structure or reinforcing fiber mat in the mold. As decorative materials there may in this connection be used carpets, textiles blocked against impregnation with polyurethane, compact or foamed plastics films, as well as spray skins or RIM skins of polyurethane. As covering layers there may also be used preformed materials suitable for external applications, such as metal foils or sheets, as well as compact thermoplastic composites of PMMA (polymethyl methacrylate), ASA (acrylic ester-modified styrene-acrylonitrile terpolymer), PC (polycarbonate), PA (polyamide), PBT (polybutylene terephthalate) and/or PPO (polyphenylene oxide) in painted, paintable prepared or colored form. As covering layers there may likewise be used continuously or batchwise-produced covering layers based on melamine-phenol, phenol-formaldehyde, epoxy or unsaturated polyester resins.

In one embodiment, the present invention is a method for the production of an environmentally friendly molded polyurethane coated article. Now referring to FIG. 1 the method of the present invention comprises the steps of first applying a first fiber material 10, having a first surface 11 and a second surface 12, to a first surface 31 of a core 30. Concurrently or sequentially, a second fiber material 20, having a first surface 21 and a second surface 22, is applied to a second surface 32 of the core 30 forming a sandwich structure 40 having a first 41 and a second surface 42 wherein the first fiber material 10 and second fiber material 20 may be the same of different. A low pressure or high pressure dispensing machine 50 may be used to apply a polyurethane-forming mixture from a mixture head 53. The polyurethane-forming mixture head 53 is fed from an A side tank 51 comprising an isocyanate and a B side tank 52 comprising a polyol component which comprises one or more natural oil based polyol. The A side and B side are mixed in the mixing head 53 and spray applied through a spray nozzle 54 to each side 41 and 42 of the sandwich structure 40. The polyurethane-forming mixture from the mixing head 53 may be applied to the sandwich structure 40 in a vertical position (not shown in FIG. 1) or preferably a horizontal position, as shown in FIG. 1. The polyurethane-forming mixture 55 is applied to the first surface 41 and a second surface 42 of the sandwich structure 40. Preferably the (clamped) sandwich structure which can be moved, preferably by robotics, in both the X and Y axis directions (length and width) beneath the dispensing machine such that an evenly distributed coating may be applied to the entire surface of the sandwich structure 40. Preferably, the sandwich structure 40 is rotated, preferably clamped and robotically rotated so that each side 41 and 42 may be sprayed 55.

Once the sandwich structure (e.g., the core/fiber covered composite) 40 is coated with the polyurethane-forming mixture it is placed in a mold 60 having a mold cavity defined by an upper mold half 61 and a lower mold half 62, said mold 60 is capable of shaping the polyurethane-mixture coated sandwich structure 40 to the desired molded article shape. Preferably, the mold 60 is temperature controlled. The mold is closed 70 and the polyurethane-forming mixture coated sandwich structure (e.g., urethane coated core/fiber covered composite) is shaped during the molding and curing step 80. Preferably, the mold temperature is between 100° C. and 160° C. While the mold is closed and while shaping is occurring/has occurred, the polyurethane-forming mixture is allowed to cure 80 forming a molded polyurethane-coated sandwich structure or a molded polyurethane article 100. The mold is opened and the molded polyurethane article 100 is removed 90 from the mold 50. Optionally, the molded polyurethane article may be post-treated by one or more treatments, for example, carpet may be applied, it may be painted, a decorative skin may be applied, it may be trimmed to a desired shape, and the like.

In a preferred embodiment, the mold is designed such that when the polyurethane-forming mixture sandwich structure is shaped, part or all of the periphery of the final molded article is shaped such that the inner core material is not visible or exposed. In other words, the cured polyurethane coated fiber surfaces 101 and 102 cover or hide the core material and/or are in contact with each other 103, FIG. 1*b*.

The PU molded articles produced in accordance with the present invention preferably are contain at least 20 percent renewable materials, preferably at least 25 percent, more preferably at least 30 percent, more preferably at least 35 percent, more preferably at least 40 percent, more preferably at least 45 percent, more preferably at least 50 percent, more preferably at least 55 percent, more preferably at least 60 percent, more preferably at least 65 percent, more preferably at least 70 percent, more preferably at least 75 percent, more preferably at least 80 percent, more preferably at least 85 percent, more preferably at least 90 percent, more preferably at least 95 percent, and most preferably the PU molded articles produced in accordance with the present invention preferably are contain 100 percent renewable materials.

The PU molded articles produced in accordance with the present invention are preferably used as structural parts or lining/cladding parts, in particular for the automobile industry, for example a load floor, furniture industry and building and construction industry. The invention will be discussed in more detail with the aid of the following examples.

EXAMPLES

The following materials are used in Examples 1 and 2 and Comparative Example A:

"DNC 420" is a three functional renewable content NOB polyol containing 70 percent soy based monomers capped on a glycerine imitated polyol;

"VORANOL™ CP 260" is a polyether polyol which is an all PO polyol based on glycerine and PO, 3 functional with a 85 HEW and is available form The Dow Chemical Company;

"MEG" is mono ethylene glycol;

"VORANOL RA 640" is a polyether polyol which is an adduct of propylene oxide and ethylene diamine, 4 functional with 88 HEW and is available form The Dow Chemical Company;

"SPECFLEX NC700(1) is a 40 percent styrene acrylonitrile grafted copolymer polyol in glycerine initiated PO polyether polyol capped with 20.3 percent EO, 1600 HEW and is available form The Dow Chemical Company;

"PAPI 27" is a is a polymethylene polyphenylisocyanate that contains MDI and is available from The Dow Chemical Company;

"POLYCAT SA1/10" is heat activated gel catalyst available from Air Products;

"DESMORAPID™ DB is a gelling catalyst available from ReinChemie;

"Black Paste Repi" is a black paste concentrate in polyol available from Dayglow Color Dispersion;

"LOXIOL™ G71SF" is a fatty acid internal mold release available from Cognis;

"Glycerin" is glycerol propane 1,2,3 triol having a MW 92; and

"Sandwich Structure" is a recycled honey comb paperboard core and covered on each side with a glass matt having 600 grams per square meter chopped random glass fiber.

The compositions of the polyurethane-forming mixtures for Examples 1 and 2 and Comparative Example A are given in Table 1 and are in given in weight percent based on the total weight of the mixture. Example 1 has 35 percent renewable content and Example 2 has 50 percent renewable content.

Figure 2:
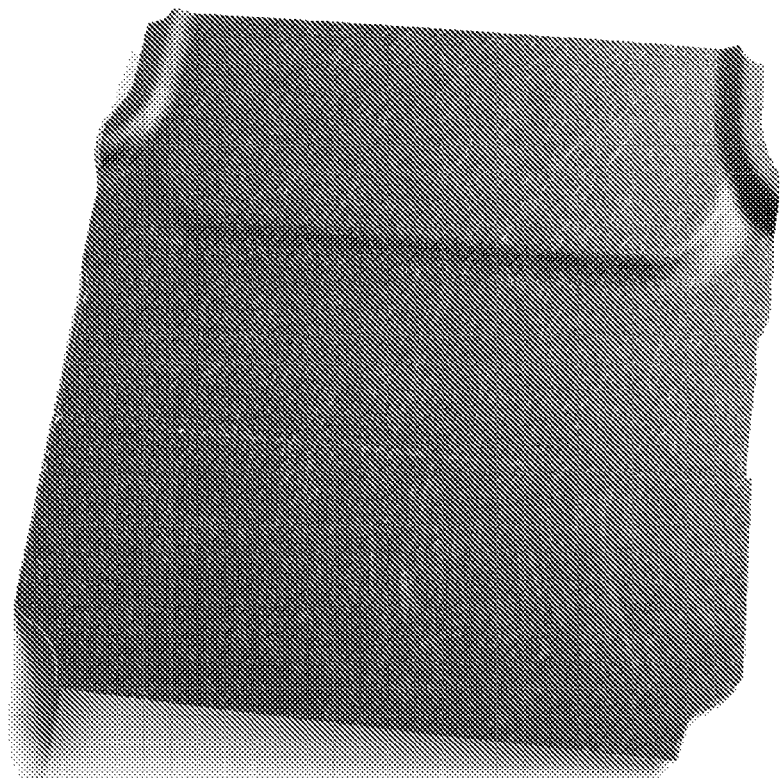
FIG. 2 is a photograph of a polyurethane molded article of the present invention.

The three foot square sandwich structure of glass and recycle honey comb core is gripped at the edges by a robotic controlled gripper. The isocyanate component and polyol component are mixed in a 55:35 ratio, respectively in a Hennecke mix head. The sandwich structure is placed under the mix head where the polyurethane-forming mixture is dispensed at ambient temperature via a cone shaped spray at 80 grams per second. The sandwich structure is moved in a discrete pattern under the mix head to apply urethane evenly to a first surface. The sandwich structure is then flipped over and again moved under the mix head in a discrete pattern until the second surface is evenly covered with the polyurethane-forming mixture. The polyurethane-forming mixture coated sandwich structure is then placed in a heated mold. The mold closed. After 120 seconds, the mold is open and the molded urethane coated sandwich structure is removed. The final automotive load floor molded article measures about 28 inches by 31 inches and is trimmed from the molded article, FIG. 2.

Figure 3:
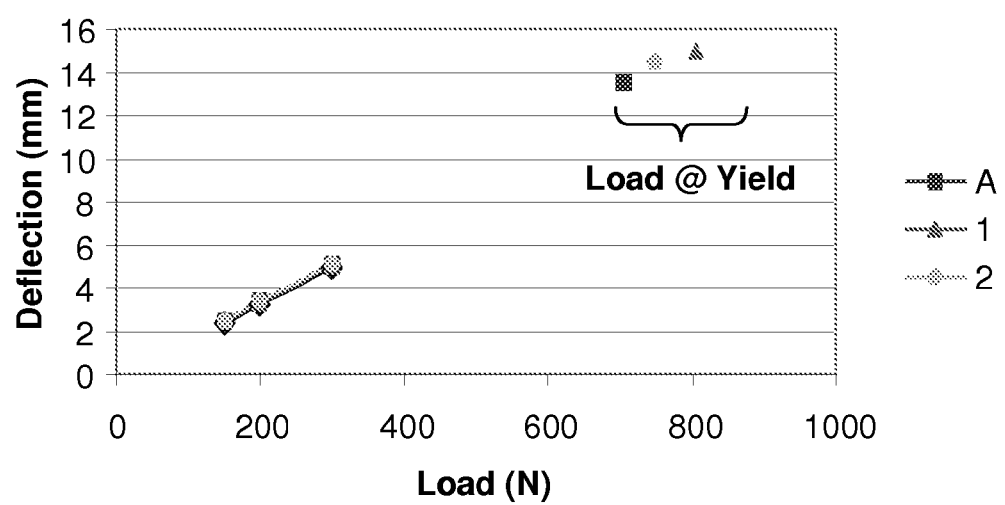
FIG. 3 is a plot of deflection versus load for Examples 1 and 2 and Comparative Example A.

Load testing is performed on 12 inch by 4 inch samples cut from the molded load floors from Examples 1 and 2 and Comparative Example A. Load testing is performed using an INSTRON™ testing machine with a cross-head speed of 12.7 millimeter per minute and measuring deflection at specific loads at ambient temperature, the results are shown in FIG. 3.

Figure 4:
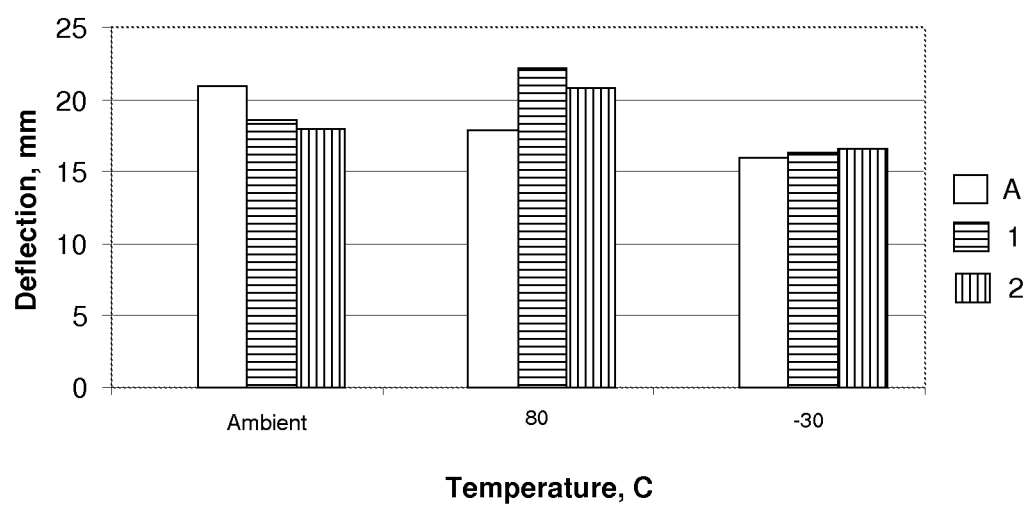
FIG. 4 is a plot of deflection from a fixed load versus temperature for Examples 1 and 2 and Comparative Example A.

Load test are also performed on an in tack load floor at −30° C., ambient temperature, and 80° C. by adding 75 pounds of free weights over a 21 inch span and the amount of deflection is measured, FIG. 4.

Samples are also tested for volatile organic (VOC) emissions by a bag method wherein a molded load floor is placed in a bag, heated to 80° C. and the released gases collected over cartridges impregnated with 2,4-dinitrophenylhydrazine (DNPH) and phosphoric acid used in testing for formaldehyde and acetylaldehyde and Tenax tubes. The results are given in Table 2.

Examples 1 and 2 and Comparative Example A are tested for 20 hours at 80° C. with 40° C. cooling water and a 1 hour recovery. The percent haze difference is reported in Table 3. None of the panels had fogging.

TABLE 1

| Component | Com. Example A | Example 1 | Example 2 |
|---|---|---|---|
| VORANOL CP 260 | 54.3 | 50.3 | 25.3 |
| DNC 420 | | 20 | 30 |
| MEG | 10 | 9 | 9 |
| Water | 1 | 1 | 1 |
| VORANOL RA 640 | 10 | 5 | 5 |
| GLYCERIN | | | 15 |
| SPECFLEX NC700 | 10 | | |
| POLYCAT SA1/10 | .2 | .2 | .2 |
| DESMORAPID DB | .5 | .5 | .5 |
| Black Paste Repi | 5 | 5 | 5 |
| LOXIOL G71SF | 9 | 9 | 9 |
| Polyurethane-forming Mixture | | | |
| ISO:POLY | 163:100 | 159:100 | 188:100 |
| Tank temperature, °F. | 80 | 80 | 80 |
| Mix pressure, psi | 2000 | 2000 | 2000 |
| Tool temperature, °F. | | | |
| Top | 225 | 225 | 225 |
| Bottom | 221 | 221 | 221 |
| Cure time, seconds | 120 | 120 | 120 |

TABLE 2

| Emissions | Com. Example A | Example 1 | Example 2 |
|---|---|---|---|
| Toluene | <0.5 | <0.5 | <0.5 |
| Xylene | <0.5 | <0.5 | <0.5 |
| Ethylbenzene | <0.5 | <0.5 | <0.5 |
| Styrene | <0.5 | <0.5 | <0.5 |
| Tetradecane | <0.5 | <0.5 | <0.5 |
| T-VOC | 8.4 | 11.7 | 14.9 |
| Formaldehyde | 0.76 | 0.69 | 0/69 |
| Acetaldehyde | 1.6 | 1.3 | 0.85 |

TABLE 3

| | Com. Example A | Example 1 | Example 2 |
|---|---|---|---|
| Haze, % | 0.06 | 0.08 | 0.06 |

The invention claimed is:

1. A method for the production of an environmentally friendly polyurethane molded article, consisting of the steps of:
   a) applying a first fiber material having a first surface and a second surface to a first surface of a core material;
   b) applying a second fiber material having a first surface and a second surface to a second surface of the core forming a sandwich structure having a first and a second surface wherein the first and second fiber material may be the same or different;
   c) applying a polyurethane-forming mixture comprising an isocyanate component and a polyol component comprising one or more natural oil based polyol to the first and a second surface of the sandwich structure forming a polyurethane-forming mixture coated sandwich structure;
   d) placing the polyurethane-forming mixture coated sandwich structure into a mold;
   e) shaping the polyurethane-forming mixture coated sandwich structure in a mold at a temperature between 100° C. and 160° C. while curing the polyurethane-forming mixture to form a molded polyurethane molded article;
   f) removing the molded article from the mold; and
   g) optionally, post-treating the molded article.

2. The method of claim 1 wherein the one or more natural oil based polyol comprises at least one of a hydroxymethylated fatty acid or a hydroxymethylated fatty acid (methyl)ester.

3. The method of claim 1 wherein the one or more natural oil based polyol comprises at least one of a polymerized hydroxymethylated fatty acid or a hydroxymethylated fatty acid (methyl)ester.

4. The method of claim 1 wherein the one or more natural oil based polyol comprises the reaction product of at least one of a hydroxymethylated fatty acid or a hydroxymethylated fatty acid (methyl)ester and an initiator compound having a OH functionality, primary amine functionality, secondary amine functionality, or combination OH, primary, or secondary amine functionality, of between about 2 and about 4.

5. The method of claim 4, wherein the initiator compound is selected from ethylene glycol, 1,2- and 1,3-propylene glycol, 1,4- and 2,3-butane diol, 1,6-hexane diol, 1,8-octane diol, neopentyl glycol, cyclohexane dimethanol, 1,3-cyclohexane dimethanol and 1,4-cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol, and combinations thereof.

6. The method of claim 5, wherein the initiator compound comprises a mixture of 1,3-cyclohexane dimethanol and 1,4-cyclohexane dimethanol.

7. The method of claim 1 wherein the core material is a honeycomb paperboard, a plastic honeycomb, aluminum honeycomb, balsa wood, a rigid foam, compressed or uncompressed cotton fibers, compressed or uncompress natural fibers, or compressed or uncompressed plastic fibers.

8. The method of claim 1 where in the first fiber material and second fiber material are independently a reinforcing fiber material, a woven fiber mat, a non-woven fiber mat, a continuous strand fiber, a fiber random structure, a fiber tissue, chopped fibers, ground fibers, a knitted fabric, or combination thereof.

9. The method of claim 8 where in the first fiber material and second fiber material independently comprise carbon fibers, polymeric fibers, aramide fibers, mineral fibers, glass fibers, natural fibers, or mixtures thereof.

10. The method of claim 1 wherein the molded article comprises at least 20 percent renewable materials.

11. The method of claim 1 wherein the molded article is an automobile load floor.

* * * * *